April 15, 1958 — DU BOIS EASTMAN — 2,830,883
GASIFICATION OF SULFUR-BEARING CARBONACEOUS FUELS
Filed April 29, 1954
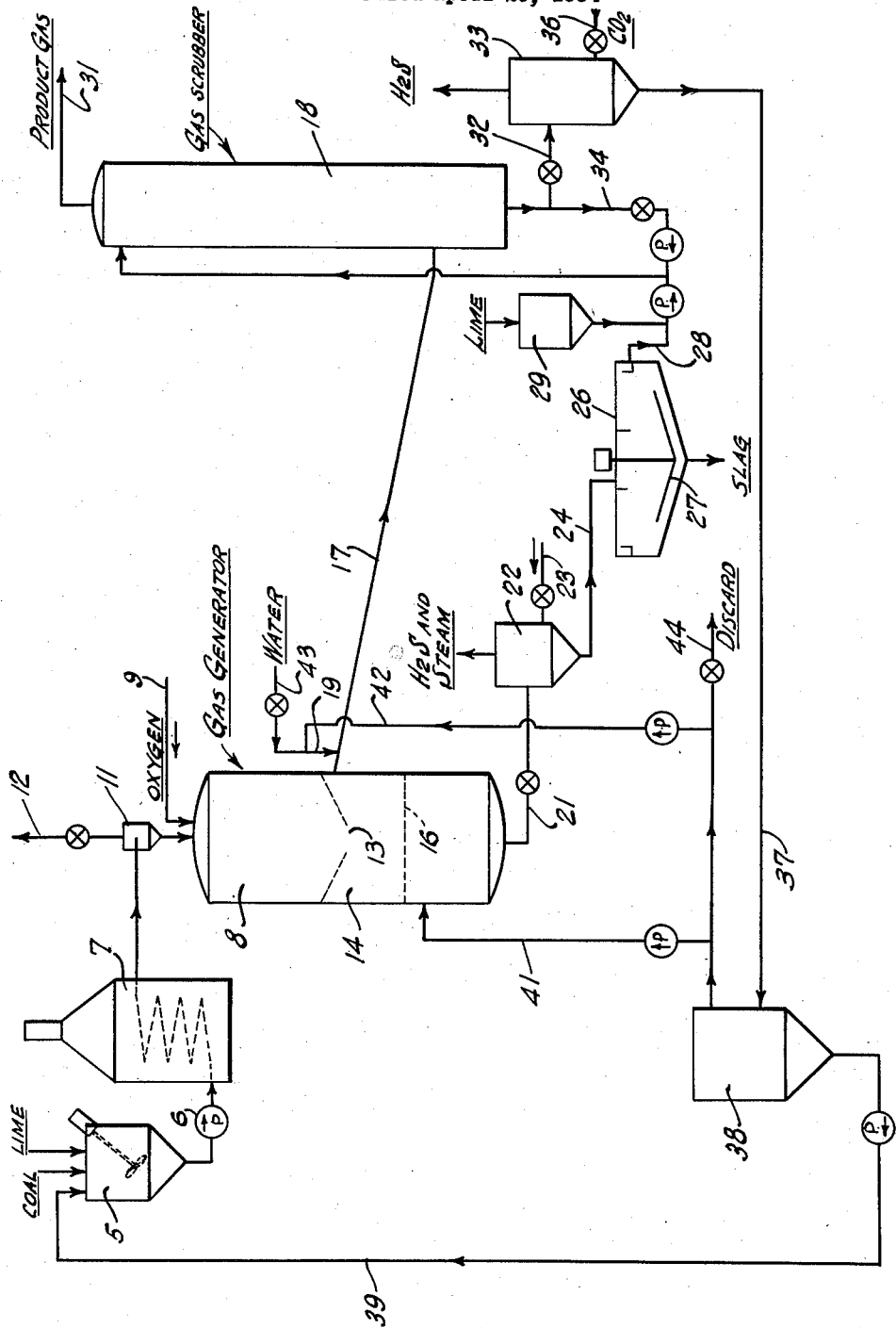

United States Patent Office 2,830,883
Patented Apr. 15, 1958

2,830,883
GASIFICATION OF SULFUR-BEARING CARBONACEOUS FUELS

Du Bois Eastman, Whittier, Calif., assignor to The Texas Company, New York, N. Y., a corporation of Delaware Application April 29, 1954, Serial No. 426,419

6 Claims. (Cl. 48—206)

This invention relates to a process for the gasification of a solid carbonaceous fuel by reaction with an oxygen-containing gas. In one of its more specific aspects, this invention relates to a method for effecting removal of sulfur-containing gases from the products of partial oxidation of a sulfur-containing solid carbonaceous fuel.

The gasification of solid carbonaceous fuels by reaction with a limited quantity of oxygen to produce carbon monoxide may be carried out successfully at temperatures above about 1,800° F. Generally, the reaction is most satisfactorily conducted at a temperature in the range of 2,200 to 3,200° F. While air may be used directly as the source of oxygen for gasification, it is generally desirable to employ oxygen-enriched air or substantially pure oxygen in the gasification reaction to reduce the quantity of nitrogen in the product gas. The reaction of a carbonaceous fuel with uncombined or free oxygen is an exothermic reaction. Steam or carbon dioxide, both of which undergo endothermic reaction with carbon, may be employed as supplemental reactants to produce additional amounts of carbon monoxide and hydrogen.

The product gas from the gasification reaction comprises mainly carbon monoxide together with some carbon dioxide and hydrogen. Hydrogen is produced from hydrocarbon constituents of the fuel, moisture contained in the fuel, or from steam supplied to the reactor. Nitrogen, which may be contained in either or both the fuel and the oxygen-containing gas, usually appears also in the product gas stream. Many solid fuels contain sulfur. When a sulfur-containing fuel is reacted with oxygen, a sulfur-containing gas, usually sulfur dioxide, is produced which is present in the product gas stream.

We have found that the quantity of sulfur-containing gas appearing in the product gas stream may be reduced by the addition of lime to the synthesis gas generator. Lime (CaO), hydrated lime (Ca(OH)$_2$), or limestone (CaCO$_3$) may be supplied to the gas generator, e. g., by addition to the fuel. The amount of lime (calcium oxide or its equivalent as calcium hydroxide or calcium carbonate) required to remove sulfur is relatively small. Theoretically, each atom of calcium is capable of combining with an atom of sulfur contained in the fuel so that 1.75 pounds of calcium oxide is theoretically capable of removing 1 pound of sulfur from the fuel. In actual practice, we have found that more lime than the theoretical amount is required to remove all of the sulfur. We have also found that even when excess lime is added to the generator, some sulfur-containing gas still appears in the product gas stream. This is probably due to decomposition of the compound or compounds formed between calcium and sulfur at the temperatures existing in the generator. In accordance with the present invention, lime is supplied to the generator in an amount in excess of that theoretically required for the removal of all of the sulfur contained in the fuel. "Lime" is used in its broadest sense to include calcium oxide, calcium hydroxide and calcium carbonate. Calcium hydroxide or calcium carbonate supplied to the gasification reaction zone is converted to calcium oxide at the reaction temperature.

In our process, gases from the reactor are contacted with water containing lime (hydrated) either in solution or as a slurry. Substantially complete removal of the sulfur-containing gas is effected by contact of the product gas with the limewater.

In a preferred embodiment of the present invention, solid carbonaceous fuel containing sulfur and an incombustible residue is reacted with an oxygen-containing gas at a temperature above the fusion temperature of the ash or incombustible residue. Solid fuel may be gasified with fusion of the ash in a stationary bed (or downwardly moving bed), or in a flow-type reaction system. A flow-type gasification reaction system may be defined as one in which pulverized solid fuel is reacted with oxygen while in the suspension in oxygen-containing reactants and reaction products. In the flow-type generator, the solid and gaseous reactants are proportioned to produce substantially complete reaction of the fuel and free oxygen. Some excess fuel is usually supplied to the reactor, but this amount preferably is kept at a minimum. Preferably, relatively pure oxygen, for example, commercial oxygen, containing above about 95 percent oxygen by volume, is employed as the oxygen-containing gas. Steam is preferred as the supplemental endothermic reactant. Ash is withdrawn from the gasification zone in molten form.

Fluxing agents may be added to the fuel to reduce the temperature at which the slag, i. e., the mixture of incombustible residue from the fuel and the flux, is fluid. Most coals may be fluxed with lime to yield a slag melting in the neighborhood of 2,200° F. The quantity of lime required to produce the most fluid slag may be computed in accordance with conventional blast furnace practice. In general, the most fluid slag is obtained when the sum of the lime and magnesia is approximately equal in weight to the sum of the alumina and silica contained in the feed (fuel and flux). The lime or magnesia may be added as carbonates or silicates; in determining the quantities required for fluxing, computations are made on the basis of their oxide equivalence. In some instances, it may be desirable to add fluorspar, silica, alumina, magnesia, or recycle slag to the feed to the generator to increase the fluidity or quantity of the slag.

An object of this invention is to provide an improved process for the gasification of a solid carbonaceous fuel by reaction with an oxygen-containing gas.

Another object is to provide an improved process for the production of carbon monoxide and hydrogen substantially free from sulfur-containing gases from a solid carbonaceous fuel containing sulfur.

Still another object of this invention is to provide an improved process for the removal of sulfur-containing gases from a mixture of carbon monoxide and hydrogen.

Other objects and advantages of this invention will be apparent from the following detailed description of a specific example of the process of the invention.

The figure is a schematic flow diagram illustrating the principles of operation of the process of this invention. With reference to the drawing, a slurry of coal, water, and lime is prepared in a mixer 5. Part or all of the lime may be introduced into the system at this point or at a later point in the system, as will be brought out hereinafter. The slurry is picked up by pump 6 and passed through a tubular heater 7 at a velocity in excess of about 1 foot per second sufficient to insure turbulent flow. The pump 6 increases the pressure of the slurry to an elevated pressure sufficiently in excess of the pressure in the generator to produce flow through the heater. The water is vaporized from the slurry in the heater forming a dispersion of solid particles in steam flowing at a velocity in excess of about 20 feet per second.

Particles of coal dispersed in steam and intimately associated with lime are introduced into the gas generator 8 into admixture with oxygen from line 9 in a suitable mixer-burner. If desired, steam may be separated from the dispersion in a suitable separator 11 which may be in the form of a cyclone-type separator. Steam and other gases separated from the fuel particles are discharged through line 12.

The generator comprises a compact, unpacked reaction zone 8 autogeneously maintained at a temperature in the range of 2,000 to 3,000° F. The generator is maintained at a temperature above the melting point of the slag resulting from the lime and the ash from the fuel. With most U. S. bituminous coals the slags have a melting point, when fluxed with lime or other suitable fluxes, in the neighborhood of 2,200° F.

The generator pressure may range from atmospheric to 2,000 pounds per square inch. Generally, a pressure within the range of 100–400 p. s. i. g. is desirable.

The proportions of fuel and oxygen supplied to the generator are regulated to produce near-maximum amounts of carbon monoxide. Steam supplied to the generator with the fuel prevents excessive temperatures and, by reaction with carbon in the fuel, serves as a source of hydrogen.

The product gas, consisting principally of carbon monoxide and hydrogen, is discharged from the reaction zone 8 through an outlet 13 into a slag quench chamber 14. Molten slag drains from the reaction zone into the slag quench chamber. A quantity of water, the level of which is indicated by dotted line 16, is maintained in the quench chamber; the slag dropping into the water is immediately solidified and broken up into small discrete particles.

Product gas from the generator is withdrawn through a transfer line 17 to a scrubbing tower 18. Water from a suitable source, discussed in more detail hereinafter, is introduced through line 19 into transfer line 17 at the outlet from quench chamber 14.

Sulfur, introduced into the generator with the fuel, reacts to some extent with the lime (and possibly with other constituents of the slag) so that the slag from the generator contains some sulfur, probably as calcium sulfide. Although calcium sulfide is decomposed by the water, some sulfur from the fuel remains in the slag withdrawn from quench chamber 14 through line 21 into a flash tank 22.

Flash tank 22 is operated at substantially atmospheric pressure. Steam and gases are liberated from the stream withdrawn from the quench chamber. Hydrogen sulfide is liberated with the steam, probably resulting from the hydrolysis of calcium sulfide to calcium sulfhydrate, $Ca(SH)_2 6H_2O$, and decomposition of calcium sulfhydrate to calcium hydroxide and hydrogen sulfide. Stripping steam may be introduced into the flash tank through line 23.

The water and slag are drawn from flash tank 22 through line 24 into a settler 26. The settler may be provided with revolving arms 27. A settler of the type known as the Dorr thickener is suitable for use at this point in the process. The residual solid slag is withdrawn from the bottom of the settler, while water containing dissolved constituents from the slag, principally lime, is withdrawn through line 28 from which it passes to the top of gas scrubber 18. Lime may be added to the stream in line 28 from a hopper 29. Part or all of the lime required for the process may be supplied to the system at this point.

Limewater introduced to the top of scrubber 18 through line 28 flows downwardly through the scrubber where it countercurrently contacts the gas stream from the generator introduced through line 17. Either a solution or a slurry of lime may be supplied to the scrubber through line 28. Preferably the gas scrubber is provided with a suitable arrangement of baffles or bubble cap trays to insure intimate contact between the gas and the limewater.

The product gas, comprising carbon monoxide and hydrogen substantially free from sulfur-containing gases, is discharged from the gas scrubber through line 31.

Water is withdrawn from the bottom of scrubber 18 and passed through line 32 to stripper 33. Part of the water withdrawn from the bottom of gas scrubber 18 may be passed through line 34 into line 28 and recirculated to the top of the scrubber.

Stripper 33 is operated at a pressure lower than the pressure in the gas scrubber. The gas scrubber is usually operated at the same pressure as the gas generator, whereas the stripper 33 is preferably operated at substantially atmospheric pressure. Steam or carbon dioxide, or both, may be introduced through line 36 into stripper 33. Sulfur-containing gases associated with the water withdrawn from the gas scrubber through line 32 are eliminated from the water through stripper 33.

Carbon dioxide is preferred as a stripping agent in stripper 33. Carbon dioxide converts the calcium hydroxide contained in the water to calcium carbonate, which is only slightly soluble in water. The resulting slurry of calcium carbonate in water is passed through line 37 to a settling tank 38 where water substantially free from solid particles is decanted from the slurry. The slurry is passed through line 39 to mixing tank 5 where it is used in the preparation of the coal feed slurry for the generator. Part or all of the lime requirements may be supplied in the form of calcium carbonate from line 39.

Water separated from the slurry in settling tank 39 is passed through line 41 into quench chamber 14. Water from the same source may be passed through line 42 to line 19 to quench the product gas stream. Fresh water may be introduced, if desired, to line 19 from line 43 and may supply part or all of the water required for quenching the product gas. Water may be discarded from the system through line 44.

Obviously, many modifications and variations of the invention, as hereinbefore set forth, may be made without departing from the spirit and scope thereof, and only such limitations should be imposed as are indicated in the appended claims.

I claim:

1. A process for the production of carbon monoxide substantially free from sulfur-containing gases from a sulfur-containing solid carbonaceous fuel containing ash which comprises reacting said fuel in admixture with lime with an oxygen-containing gas in a reaction zone at a pressure above about 100 pounds per square inch gauge and a temperature above about 2,000° F. and above the fusion point of the slag resulting from the lime and from said fuel, withdrawing the resulting molten slag from said reaction zone into a slag quenching zone, contacting the slag with water at said elevated pressure in the presence of said product gas in said slag quenching zone thereby effecting solution of lime in said slag, discharging product gas from said reaction zone, withdrawing said slag and resulting limewater from said slag quenching zone, effecting removal of hydrogen sulfide-containing gas from resulting limewater in the absence of said product gas, and contacting said product gas with said desulfurized limewater.

2. A process as defined in claim 1 wherein said product gas is contacted with said limewater at a pressure above about 100 p. s. i. g.

3. A process as defined in claim 1 wherein the solution resulting from said product gas contacting step is contacted with carbon dioxide effecting conversion of substantially all of the lime in said solution to calcium carbonate with simultaneous evolution of sulfur-containing gas, and supplying calcium carbonate so obtained to said reaction zone as a source of lime.

4. A process for the production of carbon monoxide substantially free from sulfur-containing gases from a sulfur-containing solid carbonaceous fuel containing ash which comprises reacting said fuel in admixture with lime with an oxygen-containing gas in a reaction zone at a pressure above about 100 pounds per square inch gauge and a temperature above about 2,000° F. and above the fusion point of the slag resulting from the lime and from said fuel, withdrawing the resulting molten slag from said reaction zone into a slag quenching zone, contacting the slag with water at said elevated pressure in the presence of said product gas in said slag quenching zone thereby effecting solution of lime in said slag, discharging product gas from said reaction zone, withdrawing said slag and resulting limewater from said slag quenching zone, subjecting resulting limewater to reduction in pressure to about atmospheric pressure in the absence of said product gas with the evolution of hydrogen sulfide-containing gases, and contacting said product gas with said desulfurized limewater.

5. In a process for the gasification of a sulfur-bearing solid carbonaceous fuel containing ash wherein particles of said fuel and lime are admixed with water to form a slurry; said slurry is passed as a continuous stream through a heating zone wherein the water is vaporized forming a dispersion of said particles of fuel and lime in steam; and said fuel particles together with lime are introduced in admixture with oxygen-containing gas into a reaction zone autogenously maintained at a pressure above about 100 p. s. i. g. and a temperature above about 2,000° F. and above the melting point of the slag resulting from the lime and the ash from said fuel, and said slag is withdrawn from the reaction zone in molten form; the improvement which comprises withdrawing the resulting molten slag from said reaction zone into a slag quenching zone, contacting the slag in said quenching zone with water at said elevated pressure in the presence of product gas thereby effecting solution of lime in said water; discharging product gas comprising carbon monoxide and sulfur-containing gas from said reaction zone; withdrawing said slag and resulting limewater from said slag quenching zone; effecting removal of hydrogen sulfide-containing gas from resulting limewater in the absence of said product gas; and intimately contacting said product gas with said limewater solution effecting removal of sulfur-containing gas from said product gas.

6. A process as defined in claim 5 wherein sulfur-containing gas is stripped from the solution resulting from said product gas contacting step, and the resulting mixture is supplied to the slurry preparation step.

References Cited in the file of this patent
UNITED STATES PATENTS

| | | |
|---|---|---|
| 137,713 | Patterson | Apr. 8, 1873 |
| 1,247,510 | Dequide | Nov. 20, 1917 |
| 2,644,754 | Hemminger | July 7, 1953 |
| 2,669,509 | Sellers | Feb. 16, 1954 |

FOREIGN PATENTS

| | | |
|---|---|---|
| 195,061 | Great Britain | Aug. 9, 1923 |

OTHER REFERENCES

Davidson: "Gas Manufacture" (Longmans, Green and Co., 1923), pages 225 to 227.

Gas Journal, vol. 188, October-December 1929, "Wet" Purification of Coal Gas, page 107.